H. H. BUFFUM.
TUBE OF VARIABLE DIAMETER.
APPLICATION FILED MAR. 24, 1913.
1,108,128.
Patented Aug. 25, 1914.
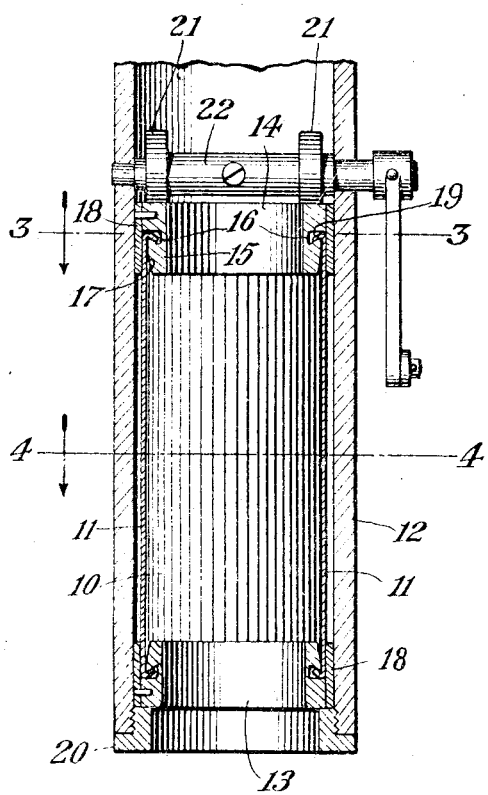
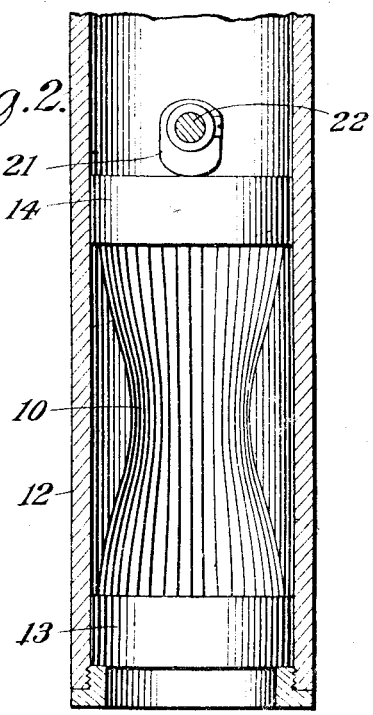
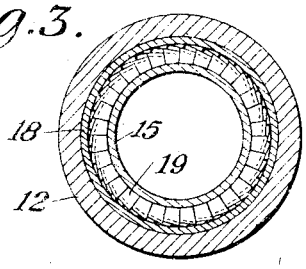
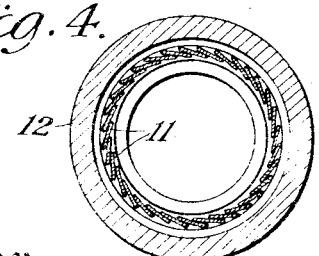
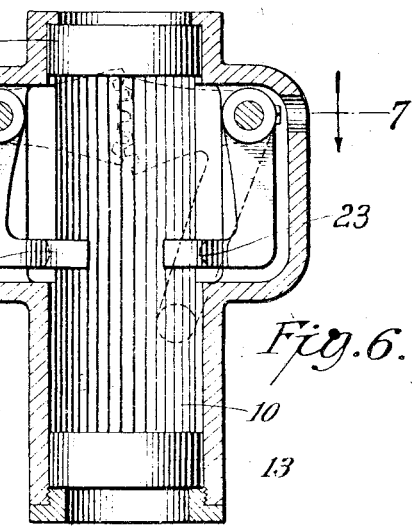
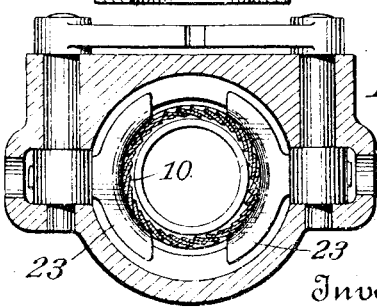

UNITED STATES PATENT OFFICE.

HERBERT H. BUFFUM, OF THE WEIRS, NEW HAMPSHIRE, ASSIGNOR OF ONE-THIRD TO ROBERT M. PIERSON, OF ELIZABETH, NEW JERSEY.

TUBE OF VARIABLE DIAMETER.

1,108,128.  Specification of Letters Patent.  Patented Aug. 25, 1914.

Application filed March 24, 1913. Serial No. 756,457.

*To all whom it may concern:*

Be it known that I, HERBERT H. BUFFUM, a citizen of the United States, residing at The Weirs, in the county of Belknap and State of New Hampshire, have invented certain new and useful Improvements in Tubes of Variable Diameter, of which the following is a specification.

This invention has for its object to provide a tube of adjustable aperture, and its further objects are to control the shape of such a tube and to furnish suitable means for the adjustment thereof.

Of the accompanying drawings, Figure 1 is a vertical sectional view of a tube and controlling apparatus constructed according to my invention, the tube being in its normal or expanded condition. Fig. 2 is a partly-sectional view at right-angles, showing the tube contracted. Figs. 3 and 4 are horizontal sections on the correspondingly-marked lines of Fig. 1. Fig. 5 is a detail elevation of one of the tube elements. Fig. 6 is a longitudinal section showing a modified form of tube-adjuster. Fig. 7 is a section on the line 7—7 of Fig. 6.

The wall of the tube 10 is composed of a series of longitudinal, overlapping, flexible plates or slats 11, preferably made of some resilient material such as spring-steel or spring-bronze, and preferably normally straight or nearly so, in order that the tube may tend to assume its greatest diameter when unconstrained. To facilitate the mounting and control of this tube I have shown it housed in an outer tube or casing 12, and the plates stepped in rings at both ends, the ring at one end being longitudinally movable; but it is to be understood that I do not regard the invention as residing only in that form of structure.

13, 14 are two-part rings at the respective ends of the tube, each comprising an inner short tube 15 circumferentially grooved at 16, and reduced and coned at 17, and a retaining sleeve 18 fixed to said short tube. The plates 11 have tangs or hooks 19 at each end, bent inwardly and occupying the groove 16, these hooks being about half the width of the plates and abutting in adjacent plates so as to preserve the desired spacing, the ends of the plates being thereby anchored against edgewise tilting movement. Fig. 5 shows one of the plates before its hooks are bent over. The invention is not confined to this particular mode of anchoring the ends of the plates.

The tube may be contracted by longitudinal or radial pressure or both. One of the rings, as the lower one 13, is here shown abutting against a fixed shoulder, furnished by a screw ring 20. In Figs. 1 and 2 longitudinal pressure is exerted against the upper ring 14 by a pair of cams 21 on a shaft 22. Thereby the upper ring is moved toward the lower one, and the flexible overlapping plates 11 are caused to bow or bend inwardly, producing a waist or contraction at the middle of the tube as represented in Fig. 2. The slightest inward bias or set of the plates when unconstrained, such as they naturally would retain after the tube has once been contracted, is sufficient to maintain the tendency toward contraction when longitudinal pressure is exerted. The contracting pressure may also be exerted radially, and the waist located more or less where desired in the length of the tube, as by the geared jaws 23 shown in Figs. 6 and 7, but I consider this method less desirable because of the tendency to wear and dent the thin plates. When the tube is contracted by these jaws, there is a relative movement of the rings 13, 14, caused by one or both sliding toward the other. A tube of this character is mainly adapted for opposing a variable resistance to a fluid flow while maintaining a favorable shape of the tube wall, but it may be employed for any other purpose to which its principle is adapted, and with any desired modification of structure.

My tube differs in its characteristics from one in which the end rings are relatively twisted in the attempt to make the plates collectively assume the shape of a warped surface. In the present invention the plates are enabled to act like bow springs, and there is no substantial tendency of the tube, when contracted, to open between the plates above and below the waist, when the plates are confined at their ends.

I prefer to use the elasticity of the plates to extend the tube and expand its waist when unconstrained, as described, although not wholly confining the invention in a broad sense to this feature. It will be noted that these plates are substantially flat or non-angular at the part which forms the waist, or in other words there are no angles or sharp bends in the active surface of the plates which might tend to form cusps at some adjustment and cause eddies in the fluid current.

I claim,—

1. A tube having its wall composed of flexible, overlapping, longitudinal, spring plates adapted to bend inwardly to form a throat of variable diameter, and means for varying the distance between the ends of said plates without relative rotation thereof.

2. A tube having its wall composed of flexible, overlapping, longitudinal, spring plates which are substantially flat or non-angular at the part which forms the waist, so as to curve gradually when the ends are caused to approach and produce the contraction of the tube, and means for varying the distance between said ends without relative rotation thereof.

3. A tube having its wall composed of flexible, resilient, overlapping plates, rings in which the ends of said plates are confined against edgewise tilting movement, said rings being capable of relative axial movement, and means for bending said plates inwardly to contract the intermediate portion of the tube, without substantial relative twisting movement of the rings.

4. A tube having its wall composed of flexible, overlapping plates, and means for exerting longitudinal pressure on one end of said tube to contract the diameter of its intermediate portion.

5. A tube having its wall composed of flexible, overlapping plates, means for holding one end of said tube against longitudinal movement, a ring connecting said plates at the opposite end of the tube, a shaft, and connections whereby the turning of said shaft exerts axial pressure upon, and thereby moves said ring toward the fixed end of the tube.

6. A tube having its wall composed of flexible, overlapping plates, provided with tangs, and a ring at one end comprising an inner tube, circumferentially grooved to receive said tangs, and an outer retaining sleeve.

In testimony whereof I have hereunto set my hand in the presence of two subscribing witnesses, the 18 day of March, 1913.

HERBERT H. BUFFUM.

Witnesses:
WILLIAM F. KNIGHT,
A. W. DINSMOOR.